(12) United States Patent
Marolia et al.

(10) Patent No.: US 11,201,838 B2
(45) Date of Patent: Dec. 14, 2021

(54) SYSTEM, APPARATUS AND METHOD FOR INCREASING EFFICIENCY OF LINK COMMUNICATIONS

(71) Applicant: Intel Corporation, Santa Clara, CA (US)

(72) Inventors: Pratik Marolia, Hillsboro, OR (US); Rajesh Sankaran, Portland, OR (US); Ishwar Agarwal, Portland, OR (US); Nitish Paliwal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 16/582,224

(22) Filed: Sep. 25, 2019

(65) Prior Publication Data

US 2020/0021540 A1    Jan. 16, 2020

(51) Int. Cl.
*H04L 12/935* (2013.01)
*H04L 29/06* (2006.01)

(52) U.S. Cl.
CPC ...... *H04L 49/3009* (2013.01); *H04L 49/3018* (2013.01); *H04L 49/3027* (2013.01); *H04L 69/22* (2013.01)

(58) Field of Classification Search
CPC ..... H04L 29/02; H04L 43/02; H04L 49/3009; H04L 49/3018; H04L 49/3027; H04L 49/9042; H04L 69/04; H04L 69/22; H04W 28/06
See application file for complete search history.

(56) References Cited

U.S. PATENT DOCUMENTS

| | | | |
|---|---|---|---|
| 7,519,058 B2* | 4/2009 | Dropps | H04L 49/357 370/389 |
| 7,721,084 B2* | 5/2010 | Salminen | H04L 63/0254 713/150 |
| 8,204,082 B2* | 6/2012 | Jungck | H04L 61/1511 370/498 |
| 8,402,540 B2* | 3/2013 | Kapoor | G06F 21/55 726/23 |
| 9,294,589 B2* | 3/2016 | Crosta | H04L 45/7453 |
| 9,900,224 B2* | 2/2018 | Dumitriu | H04L 41/5038 |
| 10,931,478 B2* | 2/2021 | Nunes | H04L 41/042 |
| 2007/0147426 A1 | 6/2007 | Sharma et al. | |
| 2008/0229415 A1* | 9/2008 | Kapoor | H04L 63/14 726/22 |
| 2019/0004990 A1 | 1/2019 | Van Doren et al. | |

OTHER PUBLICATIONS

Denis Foley, et al., "Ultra-Performance Pascal GPU and NVLINK Interconnect," 2017, 11 pages.

(Continued)

*Primary Examiner* — Thomas R Cairns
(74) *Attorney, Agent, or Firm* — Trop, Pruner & Hu, P.C.

(57) ABSTRACT

In one embodiment, an input/output port includes a stateful transmit port having: a history storage to store a value corresponding to a transmit on change field of a prior data packet; a comparator to compare a transmit on change field of the data packet to the value stored in the history storage; and a selection circuit to output the data packet without the transmit on change field when the transmit on change field of the data packet matches the value. Other embodiments are described and claimed.

20 Claims, 12 Drawing Sheets

(56) References Cited

OTHER PUBLICATIONS

Intel Corporation, "Compute Express Link, Specification, Mar. 2019, Revision: 1.0," Mar. 2019, 206 pages.
U.S. Appl. No. 16/554,974, filed Aug. 29, 2019, entitled, "Enabling Sync Header Suppression Latency Optimization in the Presence of Retimers for Serial Interconnect," by Debendra Das Sharma, et al.

* cited by examiner

Table 1

| 7 | 6 | 5 | 4 | 3 | 2 | 1 | 0 | |
|---|---|---|---|---|---|---|---|---|
| Slot0 ||| Sz | BE | Ak | RSVD | Type | 0 |
| Slot3 [2:1] || Slot2 ||| Slot1 ||| 1 |
| RspCrd |||| RSVD || SI3 | 2 |
| DataCrd |||| ReqCrd ||| 3 |
| CQID [1:0] || Opcode ||||| Val | 4 |
| CQID [9:2] ||||||| 5 |
| SAI [3:2] || CN | CLOS || NT | CQID [11:10] || 6 |
| | | | | | | SAI [1:0] || 7 |
| Addr [51:6] |||||||| 8 |
| ^ |||||||| 9 |
| ^ |||||||| 10 |
| ^ |||||||| 11 |
| ^ |||||||| 12 |
| Rsvd | Spare [4:0] |||| DomId [1:0] ||| 13 |
| BDF [7:0] |||||||| 14 |
| BDF [15:8] |||||||| 15 |

Table 2

| 7 | 6 | 5 | 4 | 3 | 2 | 1 | 0 | |
|---|---|---|---|---|---|---|---|---|
| CQID [1:0] || Opcode ||||| Val | 0 |
| CQID [9:2] ||||||| 1 |
| SAI [3:2] || CN | CLOS || NT | CQID [11:10] || 2 |
| | | | | | | SAI [1:0] || 3 |
| Addr [51:6] |||||||| 4 |
| ^ |||||||| 5 |
| ^ |||||||| 6 |
| ^ |||||||| 7 |
| ^ |||||||| 8 |
| Rsvd | Spare [4:0] |||| DomId [1:0] ||| 9 |
| BDF [7:0] |||||||| 10 |
| BDF [15:8] |||||||| 11 |
| PASID [7:0] |||||||| 12 |
| PASID [15:8] |||||||| 13 |
| RSVD |||| PASID [19:16] |||| 14 |
| RSVD |||||||| 15 |

FIG. 12

SYSTEM, APPARATUS AND METHOD FOR INCREASING EFFICIENCY OF LINK COMMUNICATIONS

TECHNICAL FIELD

Embodiments relate to communication between computing devices.

BACKGROUND

In computer systems, separate integrated circuits (and internal components of a single integrated circuit) communicate via a variety of different communication links. Typically such links carry information in the form of packet-based communications that include headers and payloads that provide data. Efficiency of a link is defined as the percentage of link bandwidth that is used to move actual data. Every link protocol has overheads for moving data. For example, a request header encodes the type of request, address and other control fields.

A request header can be termed as an overhead, such that link efficiency equals data transfer size/(data transfer size+request header size). The size of request headers has been growing as systems include larger numbers of compute nodes or devices along with memory virtualization, security and encryption information and so forth. This drop in efficiency can be particularly significant when transferring smaller data payloads, for example, for coherent links that operate on cachline size data payloads (e.g., 64 or 128 bytes).

BRIEF DESCRIPTION OF THE DRAWINGS

FIG. 12 includes Tables 1 and 2 which show how context information is packed and conveyed in different slot format types.

DETAILED DESCRIPTION

Figure 1:
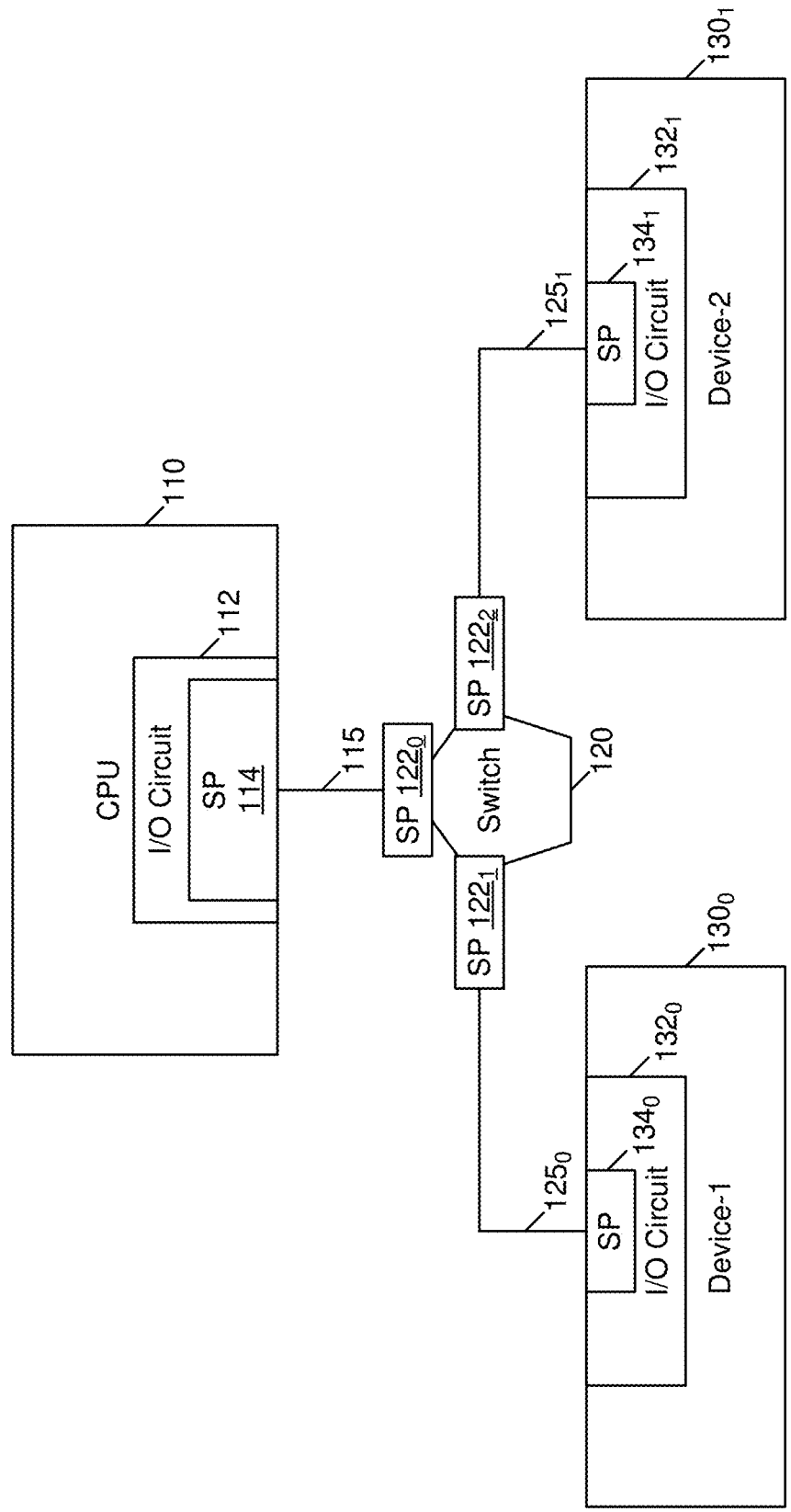
FIG. 1 is a block diagram of a system in accordance with an embodiment of the present invention.

In various embodiments, techniques are provided to improve efficiency of communications along an interconnect. More specifically, embodiments realize reduced communication overhead, in that information of data packets that does not change frequently may be filtered from being sent along the interconnect. In particular embodiments described herein, example information that does not change frequently between the different data packets includes certain information present in a header portion of the data packets. While embodiments certainly vary, an example communication protocol may provide a data format that includes a packet header having multiple fields, many of which do not change frequently between different packets. These fields, which are referred to herein as transmit on change (ToC) fields, may be identified and removed from a data packet prior to its communication along the interconnect. A particular embodiment may be used for communication of optimized data packets according to a Compute Express Link (CXL) specification-based communication protocol such as in accordance with the CXL Specification version 1.1. Embodiments may also be used in other communication protocols such as an Intel® Ultra Path Interconnect (UPI) communication protocol, a Peripheral Component Interconnect Express (PCIe) communication protocol, or so forth.

Although the scope of the present invention is not limited in this regard, in example embodiments identification of transmit on change fields and their filtering may be performed by circuitry present in input/output (I/O) circuitry of integrated circuits that couple together via one or more chip-to-chip links. In other cases, techniques described herein may be implemented within integrated circuit-internal interconnects.

In particular embodiments, I/O circuitry may be provided with one or more stateful ports that include circuitry to enable identification of transmit on change fields and their extraction/insertion as appropriate. With such stateful ports, in a transmit direction, a transmitter may remove the transmit on change fields from a packet (e.g., header packet) and transmit the packet without these transmit on change fields that did not change their value since a prior data packet. In a receive direction, a receiver may append the removed transmit on change fields to packets received without the transmit on change fields. In embodiments described herein such stateful ports may include control circuitry and storage to store these transmit on change fields for use in identification, filtering and appending. While some communication protocols may have separate header and data packets, other protocols may include both header information and data information in a single packet type. Thus understand that the term "data packet" used herein is intended to refer to a generic packet type and which may include header information, data information or a combination of both header and data information.

With embodiments, link communications may occur with reduced size of request headers, increasing effective data bandwidth for the link. Such techniques improve link efficiency in a more effective manner, particularly as compared to the cost of adding additional lanes, the additional power consumption of increasing frequencies and so forth.

In embodiments, transmit on change fields may be used to reduce communication of information regarding various header-based information, such as address domain information, address space information, routing information, cryptographic information and so forth. For example, with extreme scale virtualization, a large amount of virtual machines may be provided per server in which each virtual machine operates in an isolated address domain. Such address domain information is used by circuitry such as memory management unit (MMU) circuitry to translate addresses into system physical addresses and perform isolation checks. Regarding larger address spaces, while canonical 64 bit addresses are provided, many processors only use a smaller portion of such addressing schemes, e.g., 52 bits, allowing the unused bits to be represented as a transmit on change field. Routing identifier information, such as bus device function information also may be implemented using transmit on change fields. Another example transmit on change field may be an encryption key ID, which can be sent with memory requests and may be, in different instances between 8-16 bits.

With these example transmit on change fields, for systems having a limited number of nodes/devices, the overhead of many extra bits of routing information can be avoided on a per request basis. The same can be said for a system having a limited number of domains, address range usages and so forth.

With embodiments, when there is sufficient sequential locality of transmit on change fields across packets, average link efficiency may trend to a link efficiency level of non-transmit on change field requests, where a non-transmit on change request header equals a request header minus all transmit on change fields.

Referring now to FIG. 1, shown is a block diagram of a system in accordance with an embodiment of the present invention. More specifically, shown is a high level view of a computing system. Computing system 100 may be any type of computing device, ranging from a small portable device such as smartphone, tablet computer, laptop computer or so forth to a larger system such as client computing system, server system or the like. In the illustration of FIG. 1, only several components of a computing system are shown to not obscure relevant aspects.

As illustrated in FIG. 1, system 100 includes a central processing unit (CPU) 110. CPU 110 may be a main application processor of computing system 100, and may be implemented as a system on chip or other multicore processor. To enable communication with other components, CPU 110 includes an I/O circuit 112 having transceiver circuitry to transmit and receive communications. In embodiments herein, I/O circuit 112 includes stateful port circuitry 114 (more generally one or more stateful ports).

As further illustrated in FIG. 1, CPU 110 couples to a switch 120 via an interconnect 115. In turn, switch 120 couples to devices $130_{0,1}$ via corresponding interconnects $125_{0,1}$. In the embodiment of FIG. 1, switch 120 includes multiple stateful ports, namely stateful ports $122_{0-2}$. In this embodiment, switch 120 thus includes a corresponding stateful port for each hop along the topology. As such, a stateful port $122_0$ is provided for interaction with stateful port 114 of CPU 110, a stateful port $122_1$ is provided for interaction with a stateful port $134_0$ of device $130_0$ and a stateful port $122_2$ is provided for interaction with a stateful port $134_1$ of device $130_1$.

With this arrangement in which a stateful port is provided for each topology hop, each port may implement a single history register (for each of receive and transmit directions). While switch 120 may have some complexity with multiple stateful ports, a corresponding alleviation of the design constraints within CPU 110 and devices 130 may be realized, without incurring a scaling cost.

Figure 2:
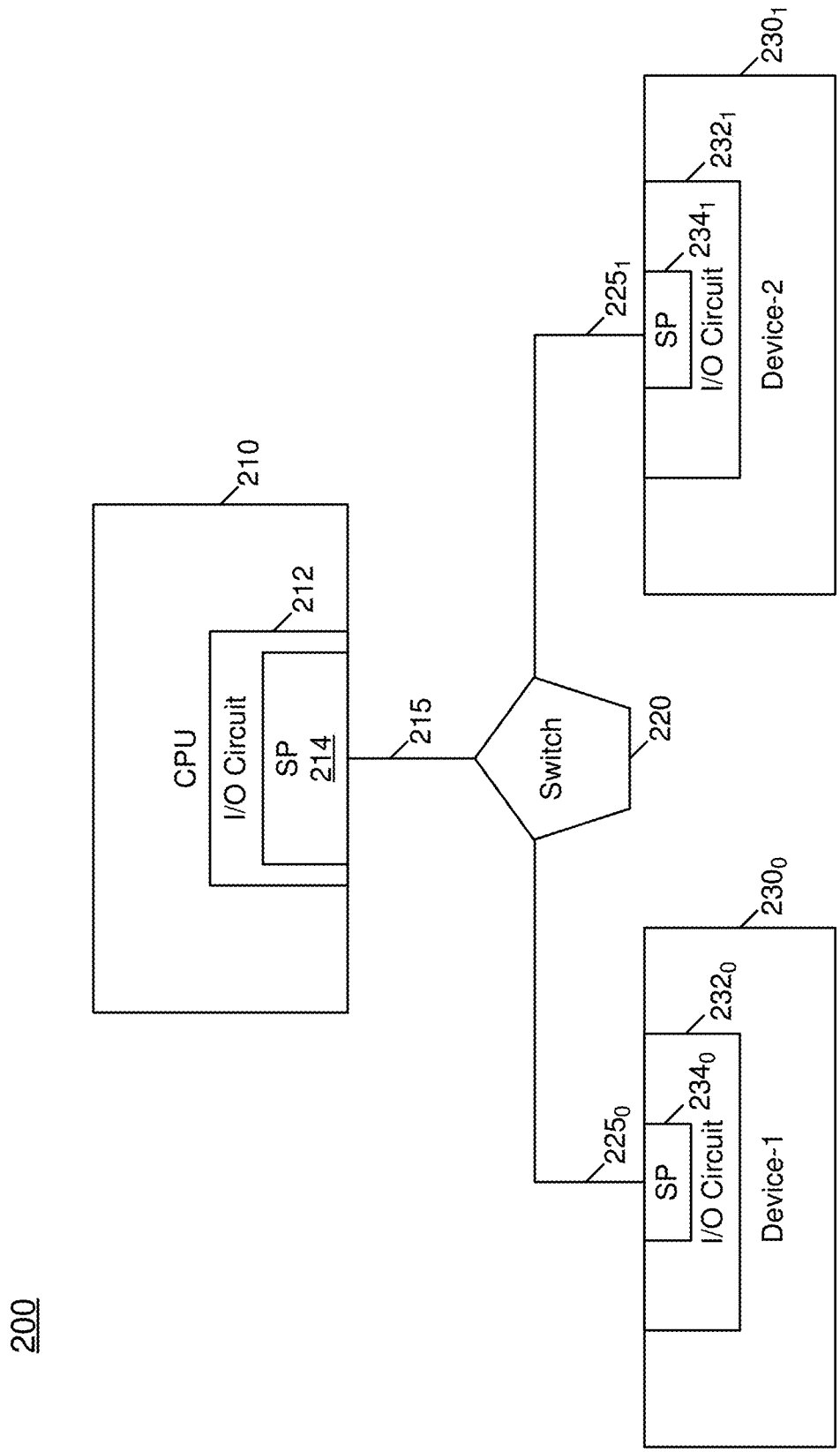
FIG. 2 is a block diagram of a system in accordance with another embodiment of the present invention.

Referring now to FIG. 2, shown is a block diagram of a system in accordance with another embodiment of the present invention. System 200 may be generally configured as in FIG. 1, with a CPU 210 (and included I/O circuit 212 and stateful port 214) that couples via an interconnect 215 to a switch 220. In turn, switch 220 couples via respective interconnects $225_{0,1}$ to devices $230_{0,1}$ (which include respective I/O circuits $232_{0,1}$ and stateful ports $234_{0,1}$).

In this arrangement of FIG. 2, switch 220 is a stateless switch. To accommodate the link efficiency techniques herein, stateful port circuitry 214 may be multi-device aware with corresponding history storages per each device in the hierarchy. While some complexity may be added, advantages may inhere in achieving better end-to-end efficiency by extracting better sequential locality.

Figure 3:
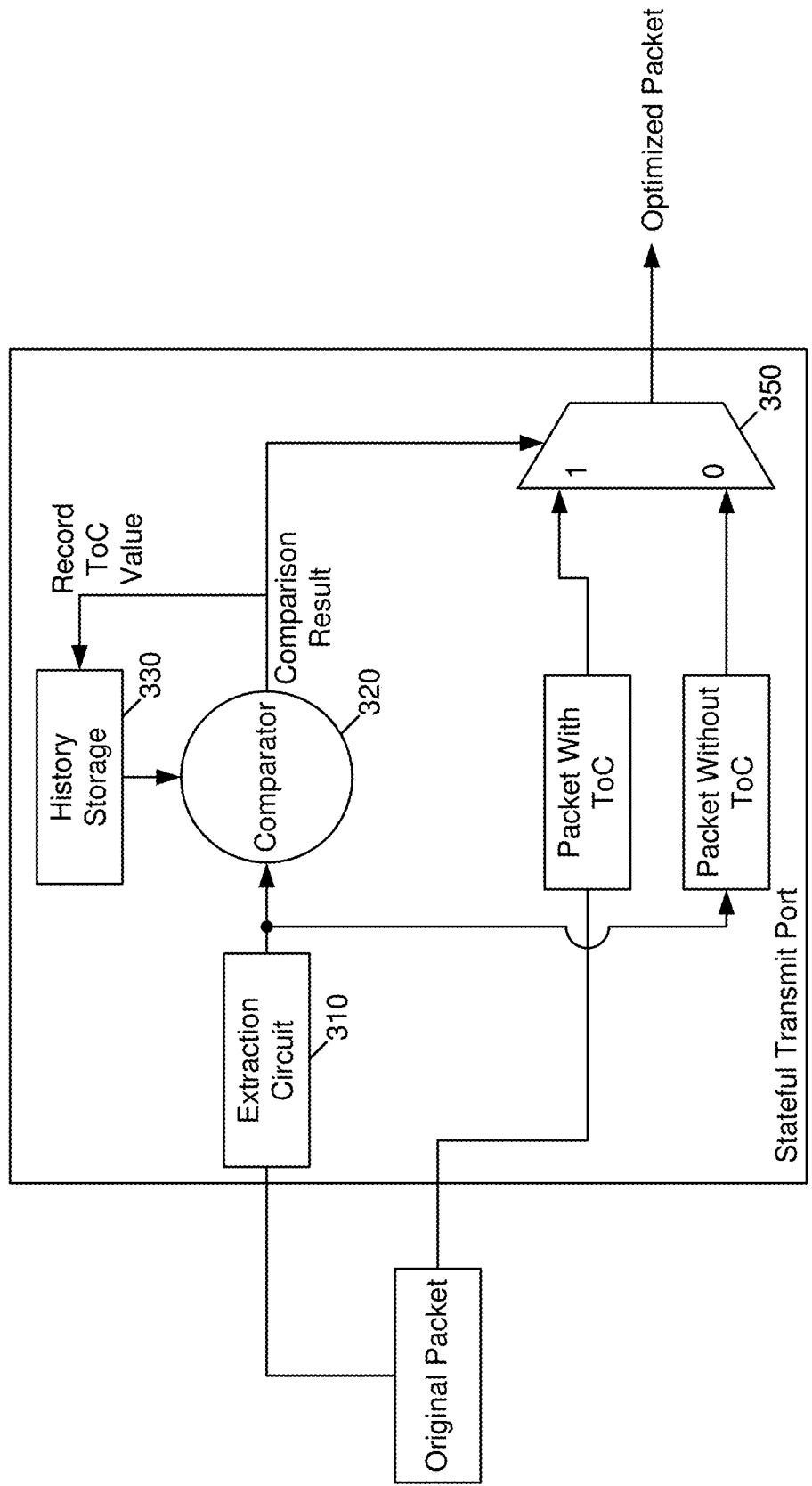
FIG. 3 is a block diagram of a stateful transmit port in accordance with an embodiment of the present invention.

Referring now to FIG. 3, shown is a block diagram of a stateful transmit port in accordance with an embodiment of the present invention. As shown in FIG. 3, stateful port 300 includes circuitry to receive, process and output a data packet. Stateful port 300 may receive an incoming data packet from another portion of an IC, e.g., a core or other processing circuit that generates a data packet. As an example, the data packet may be a request to read data from a source, write data to a destination or so forth. This data packet may be encoded according to a given communication protocol, in the form of a header portion and payload portion (optionally). While the header portion may take different forms in different embodiments, understand that typical header portions include multiple fields, including address information, routing information and/or security information, among other types of information.

As seen, the incoming data packet is provided to an extraction circuit 310 which may extract transmit on change fields of the data packet. In different embodiments, extraction circuit 310 may be configured statically or dynamically to identify such transmit on change fields within incoming data packets. Extraction circuit 310 outputs the transmit on change fields to a comparator 320. Comparator 320 may be configured to compare such transmit on change fields to a value stored in a history storage 330, which in an embodiment may be implemented as a history register. Based on the comparison, comparator 320 may output a comparison result indicating whether the received transmit on change fields match the stored transmit on change fields. If not, the newly received transmit on change fields may be stored in history storage 330. As seen, the comparison result output by comparator 320 is provided as a control signal level that controls a selection circuit 350, which in an embodiment may be implemented as a multiplexer. Thus when a match is identified, selection circuit 350 outputs the data packet without the transmit on change fields for communication of an optimized data packet. Instead when no match occurs, selection circuit 350 outputs the original data packet (including the transmit on change fields). While shown at this high level in the embodiment of FIG. 3, many variations and alternatives are possible.

Figure 4:
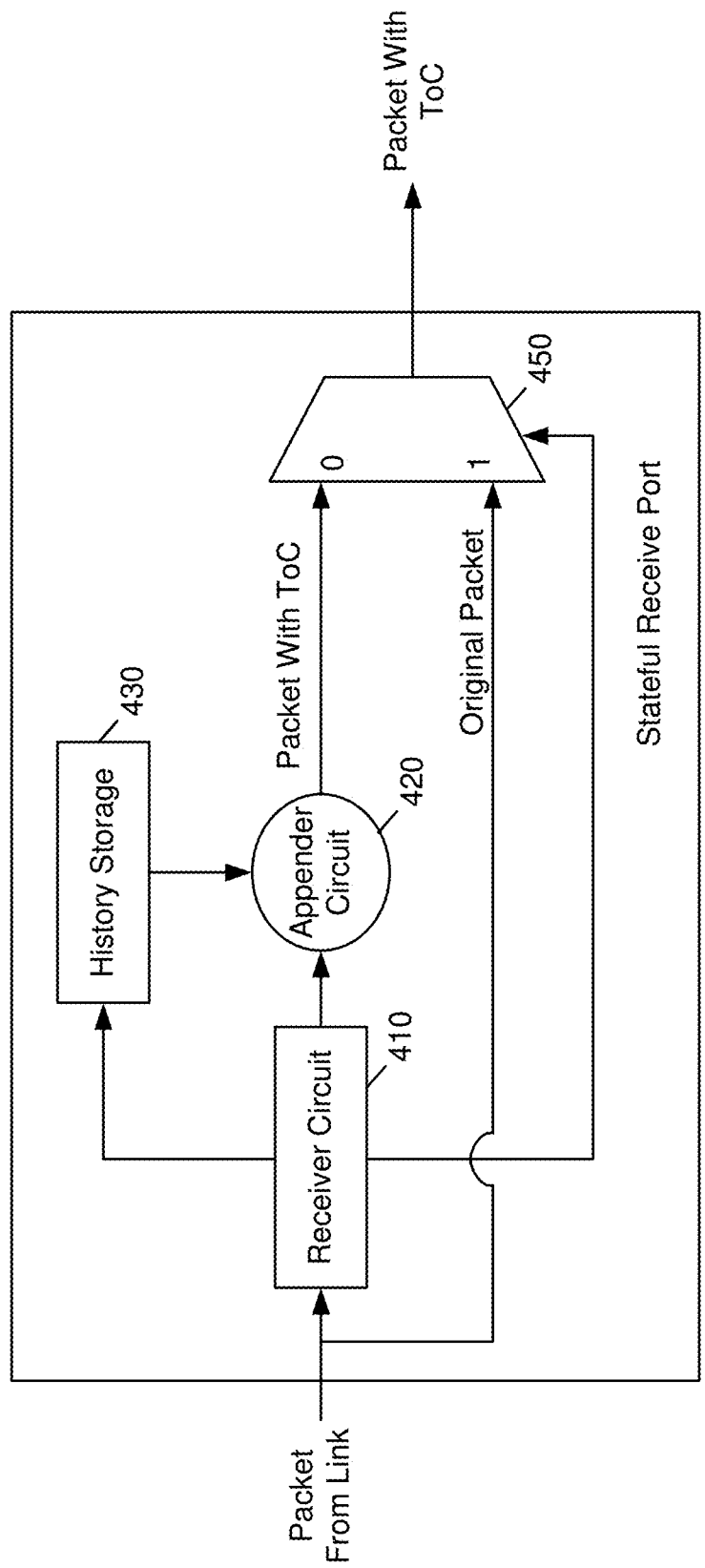
FIG. 4 is a block diagram of a stateful receive port in accordance with an embodiment of the present invention.

Referring now to FIG. 4, shown is a block diagram of a stateful receive port in accordance with an embodiment of the present invention. As shown in FIG. 4, stateful port 400 includes circuitry to receive, process and output a data packet. Stateful port 400 may receive an incoming data packet from another IC as communicated via one or more links. As illustrated, stateful port 400 receives the incoming data packet from a link within a receiver circuit 410. In an embodiment there may be two types of packets having header information, so-called ToC packets and non-ToC packets. A ToC packet may be identified by looking at a special bit, flit type, opcode type or so forth. Receiver circuit 410 may be configured to determine whether this received data packet includes transmit on change fields. If so, the transmit on change fields are provided to a history storage 430, e.g., implemented as a register, which may store these transmit on change fields of the newly received data packet.

Otherwise, if it is determined that the received data packet does not include transmit on change fields, the data packet is provided from receiver circuit 410 to an appender circuit 420, which appends stored transmit on change fields received from history storage 430.

As further illustrated in FIG. 4, receiver circuit 410, based on this determination as to whether the incoming data packet includes transmit on change fields, sends a control signal to a selection circuit 450. Based on this control signal, selection circuit 450, which in an embodiment may be implemented as a multiplexer, outputs the received data packet with transmit on change fields. More specifically, when the incoming packet does not include transmit on change fields, selection circuit 450 is controlled to output the data packet with the appended transmit on change fields provided by appender circuit 420. Instead, when the incoming packet includes transmit on change fields, selection circuit 450 is controlled to output the data packet with such transmit on change fields. Understand while shown at this high level in the embodiment of FIG. 4, many variations and alternatives are possible.

In the CXL communication protocol, in order to support address space isolation, security measures, and authentication of translated Host Physical Address (HPAs) for CXL-.Cache communications, Device to Host (D2H) request accesses may go through a TOC history lookup on a downstream port. Such ToC history may also be referred to herein as context, and which may be communicated in so-called context slots.

For advanced virtualization techniques such as shared virtual memory, address translation and authentication may be performed using root and context table entries, whose indices are derived from bus/device/function (BDF) and process address space ID (PASID) values. These values (together referred to herein as one example of context information ("CI")) are used to uniquely identify context under which a particular D2H request is sourced. In some embodiments, techniques herein may reduce link overhead from communication of context information, and achieve high efficiency data transfers for D2H read and write requests on a CXL.Cache protocol.

In an embodiment, header information may include a Domain ID, which is a unique identifier to perform context lookup in a downstream port. That is, there can be multiple history buffers, each to store TOC information for a given Domain ID. In some embodiments, certain slot format encodings can be used for conveying context information on a link, namely a headered slot format H7 and a generic slot format G7, each bearing an encoding of 3'b111 in flit header information. H7 can carry 1 D2H request and 16b BDF, while G7 can carry 1 D2H request, 16b BDF, and 20b PASID. Shown in FIG. 12 are Tables 1 and 2 which shows how context information is packed and conveyed in each of these slot format types.

Regarding Table 1 shown FIG. 12, a high level view of a device-to-host request that includes BDF information is shown. This data packet type includes slot information, credential information, an opcode, and other information. In addition, security attributes of the initiator (SAI) information may be included, along with address information. Of particular relevance here, note that this packet format also includes a domain identifier field (DOM ID) and 16 bits of BDF information. In turn, Table 2 (shown in FIG. 12) shows a device-to-host request that includes both BDF information and PASID information. As seen in this embodiment, in addition to 16 bits of BDF information, 20 bits of PASID information is provided.

Context switch slots can be optimally utilized wherever there is a need for scalability. However, in order to amortize degraded link efficiency, requests may be sent using context switch slots only when either BDF or PASID values change. It is generally expected that most D2H requests sourced sequentially from a device belong to same context (contextual locality), such that a context switch is expected to occur infrequently.

Since a context switch is a rare event, a sender may first send a D2H request for a given context (CI) using a context switch slot once for establishing a context aware communication. Assuming there is no context switch, all subsequent D2H requests for an active CI may be sent without using a context switch slot, thus improving link efficiency. A receiver upon decoding a first incoming context switch slot format becomes aware of a CI context that the link is operating under, and is expected to cache context information. All subsequent D2H requests will be assumed to be operating under context CI until a next context switch slot is received. However, this scheme implies that a given link can only be aware of one and only one context at a given point in time. In order to support multi-context awareness on link, the Domain ID field in a D2H request header may be used to support awareness for multiple contexts concurrently.

A sender may maintain hysteresis of context information, which all outbound D2H requests are sourced under. BDF and PASID values associated with all outbound D2H requests may be saved in multiple history registers of a stateful port. A sender can allocate a unique Domain ID for each unique pair of BDF and PASID values stored in the history register. If there is a context switch, the sender can repurpose any Domain ID for a different pair of BDF and PASID values. While the policy to determine which Domain ID to repurpose is implementation specific, a sender may choose to implement any scheme such as least frequently used, least recently used, and round-robin, etc. Likewise, a receiver may save all inbound D2H request context information and allocate an entry in its history register using Domain ID information from an incoming D2H request header. For all incoming D2H requests that do not arrive embedded within a context switch slot, the receiver performs a history register lookup and retrieves context information using Domain ID information before forwarding transactions upstream.

Figure 5:
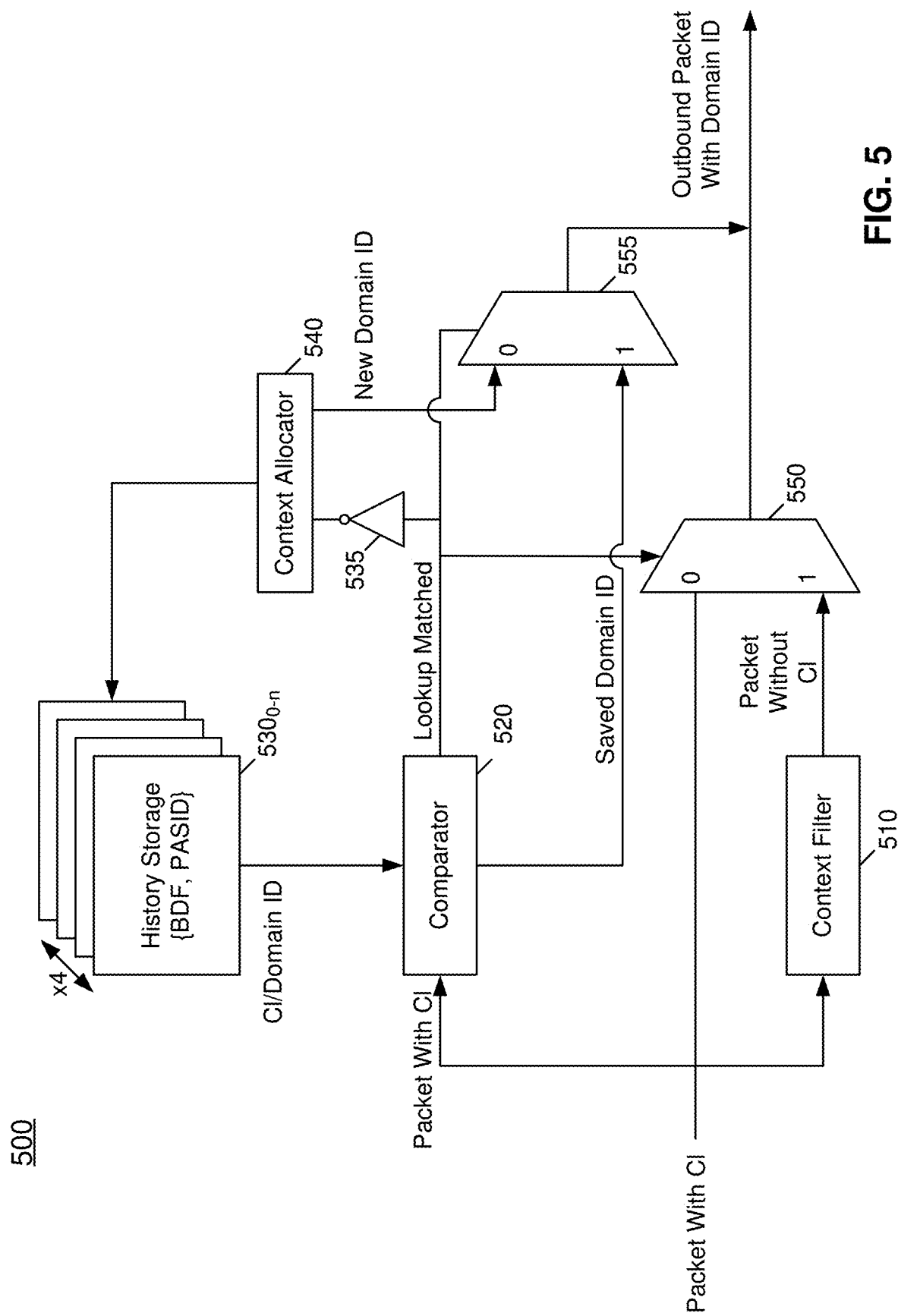
FIG. 5 is a block diagram of stateful transmit port in accordance with another embodiment of the present invention.

FIG. 5 is a block diagram of stateful transmit port in accordance with another embodiment of the present invention. In this embodiment, multiple history storages 530o-n are present such that context information of multiple domains can be stored. In other aspects, stateful transmit port 500 is generally configured the same as stateful port 300 of FIG. 3. Note that in this embodiment, a comparator 520 compares context information (e.g., BDF and PASID values) to the context information of the received packet. In this way, all requests sourced natively carry CI (BDF and PASID) values, which are looked up against saved contexts in history storage 530. If an incoming CI matches with a pre-existing entry, sender port 500 filters out CI from the request and tags it with the given Domain ID obtained via the history storage lookup. If an incoming CI does not match any pre-existing entry, sender port 500 may repurpose an existing Domain ID specifier, and allocate a CI entry into history storage 530.

Subsequently, sender port 500 uses a context switch slot and tags the outbound request with this newly allocated Domain ID. In this regard, should a lookup not match in comparator 520, via an inverter 535 and a context allocator 540, a new domain identifier, e.g., repurposed from an existing domain identifier, can be selected such that the context information can be stored in an appropriate history storage 530. And further in the FIG. 5 embodiment, there are multiple selection circuits, including selection circuit 550 to output a packet with or without the context information, and a further selection circuit 555, which outputs a corresponding domain identifier, either corresponding to the saved domain identifier or a new domain identifier. In other aspects, stateful transmit port 500 may be implemented similarly to that of FIG. 3 as discussed above.

Figure 6:
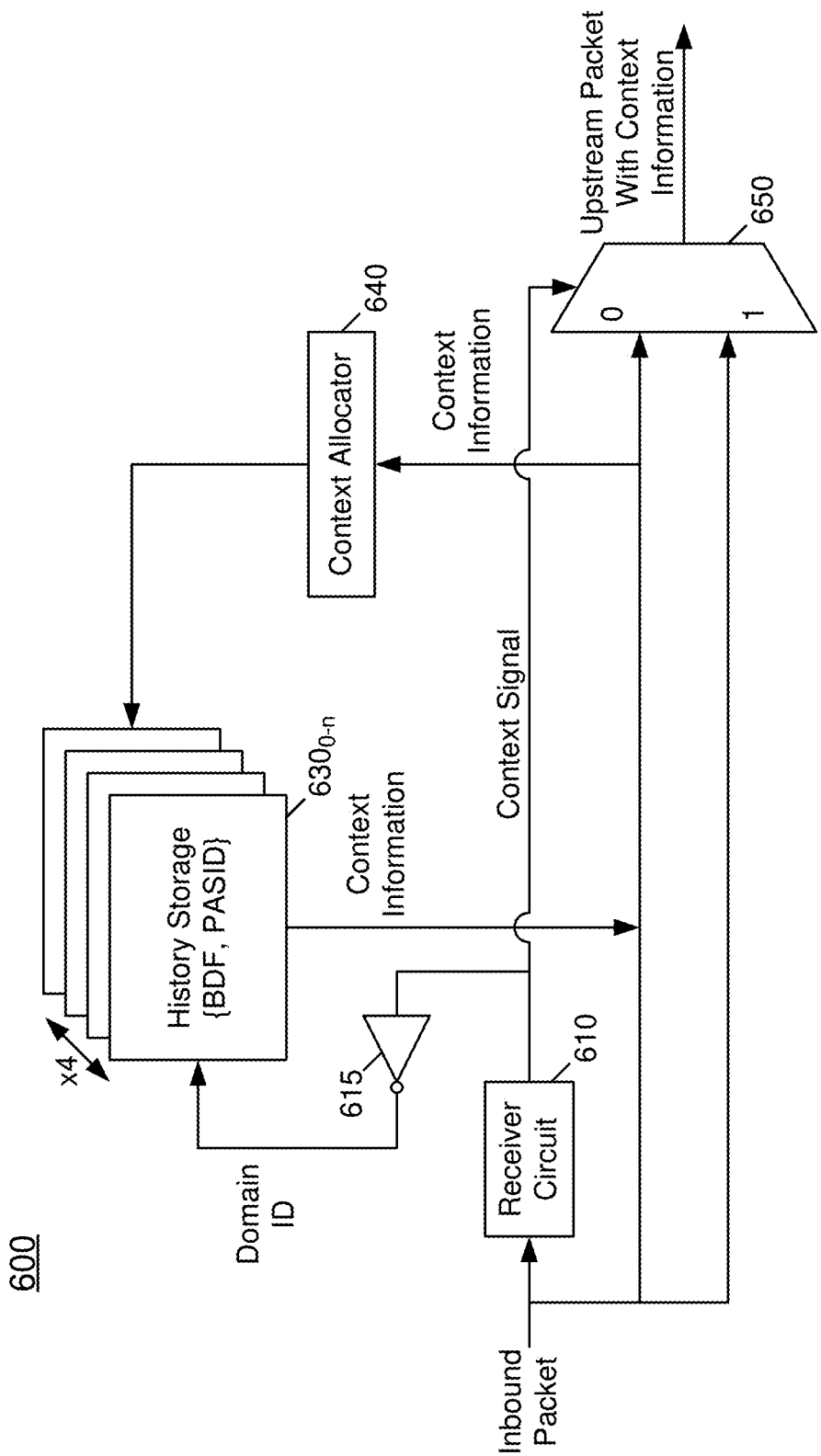
FIG. 6 is a block diagram of a stateful receive port in accordance with another embodiment of the present invention.

FIG. 6 is a block diagram of a stateful receive port in accordance with another embodiment of the present invention. In the embodiment of FIG. 6, stateful receive port 600 may be generally similarly adapted as stateful port 400 of FIG. 4, with the addition of multiple history storages $630_{0-n}$. As further shown, when it is determined that a context switch slot is received, a domain identifier is provided to history storage 630 to perform a lookup. In addition, when a new context is received via such a slot, this context information may be stored in a given one of history storages 630 via a context allocator 640. Incoming D2H requests from a link are decoded to be in presence or absence of a context switch slot. If an incoming request arrives as a context switch slot, its Domain ID field is used as an index to save context information in a given history storage 630 and the request and context information is passed upstream. If an incoming request does not arrive in a context switch slot as determined in receiver circuit 610, its Domain ID field is used as an index to retrieve context information from history storage 630 via an inverter 615. This retrieved context information is then appended with the incoming request and it is sent upstream.

Figure 7:
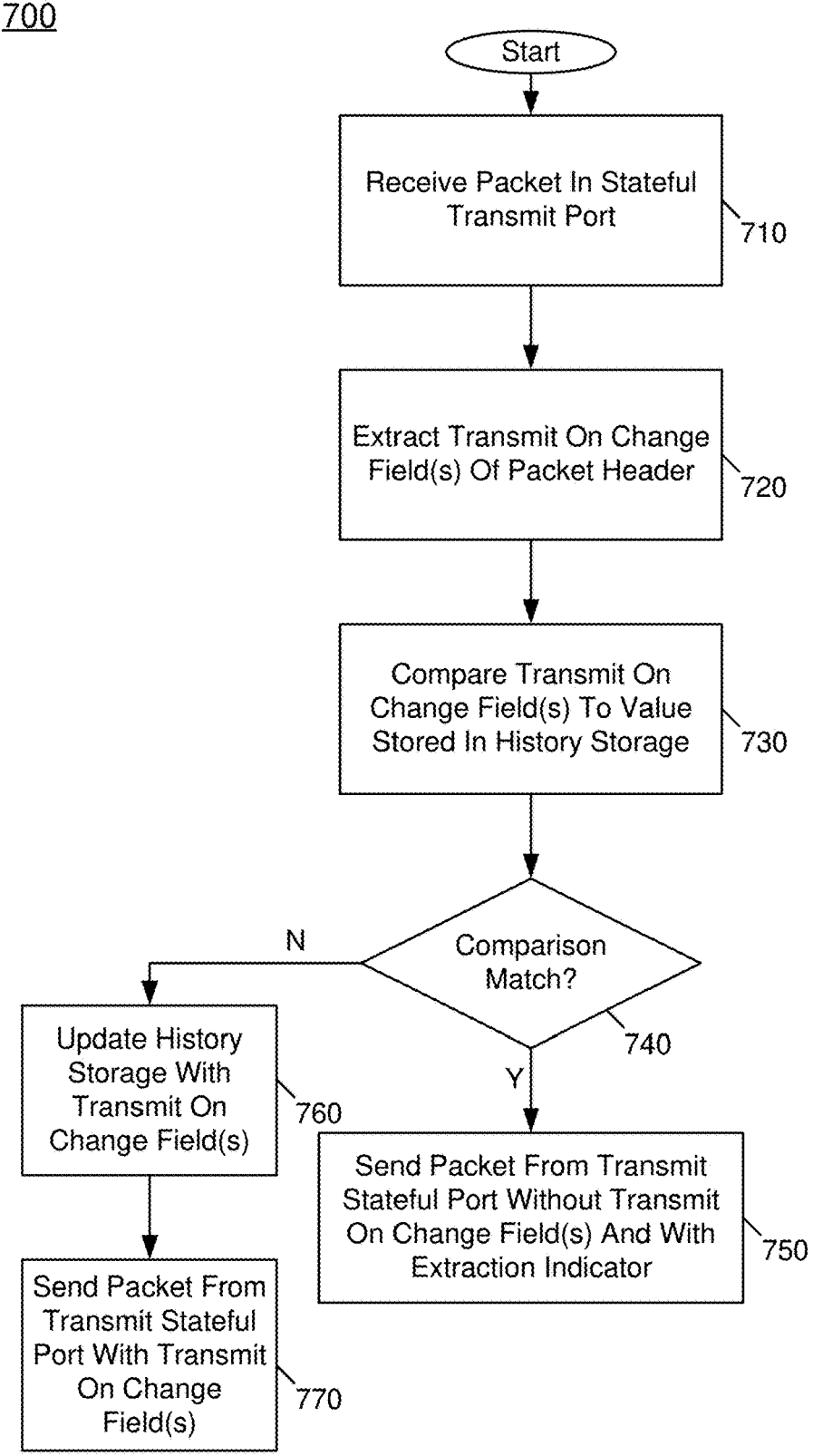
FIG. 7 is a flow diagram of a method in accordance with an embodiment of the present invention.

Referring now to FIG. 7, shown is a flow diagram of a method in accordance with an embodiment of the present invention. More specifically, method 700 is a method for handling received data packets in a stateful transmit port. As such, method 700 may be performed by hardware circuitry, firmware, software and/or combinations thereof. As illustrated, method 700 begins by receiving a data packet in the stateful transmit port (block 710). This received data packet may be received in a transaction layer from a source such as a core or other processing circuitry.

Next at block 720, the one or more transmit on change fields may be extracted from the packet header. In different embodiments, the identification of transmit on change fields may be performed statically or dynamically. In any event, the extracted transmit on change fields are compared to a corresponding value stored in a history storage, e.g., a history register of the stateful port (block 730). Based on this comparison it may be determined whether a match results (diamond 740). If so, control passes to block 750 where the data packet may be sent from the stateful port without the transmit on change fields, as it is determined that there was no change in these fields from a prior packet. Thus this data packet may be sent in a reduced or compressed state to a destination, improving link efficiency. Note that in some embodiments, this header-reduced packet may be sent with an extraction indicator, e.g., a bit, opcode, a slot format or other means to identify that this packet does not include the transmit on change fields. In other cases, no such indicator is provided and a receiver may detect the lack of transmit on change fields based on the packet size itself.

Still referring to FIG. 7, otherwise if it is determined at diamond 740 that there is no match between the transmit on change fields, control passes to block 760. At block 760 the history storage may be updated with transmit on change fields of this newly received packet. Then at block 770 the data packet may be sent from the stateful port with the transmit on change fields. Thus in this situation the full data packet is sent since at least some new information is present within the transmit on change fields.

Understand while shown at this high level in the embodiment of FIG. 7, many variations and alternatives are possible. For example, FIG. 7 shows an arrangement in which one or more transmit on change fields are considered as a unitary structure. It is also possible to perform finer-grained analysis of transmit on change fields, such that each transmit on change field can be individually compared to a prior corresponding transmit on change field, and individual fields can be sent (or not sent) based on such comparison. However, in some cases the complexity of such an arrangement may dictate in favor of a coarser-grained approach such as described in the embodiment of FIG. 7.

Furthermore, while FIG. 7 shows an embodiment in which multiple history storages are not present, when a stateful port includes multiple history storages, the above method may further include determining whether received context information of a request matches saved context in one of the history storages. If so, the context information may be filtered out and a given domain identifier is sent to identify the corresponding location in the stateful receive port history storage from which the context information may be obtained. Instead if no hit occurs and new context information is to be stored into one of the history storages, a context switch slot may be communicated with the newly allocated domain ID.

Figure 8:
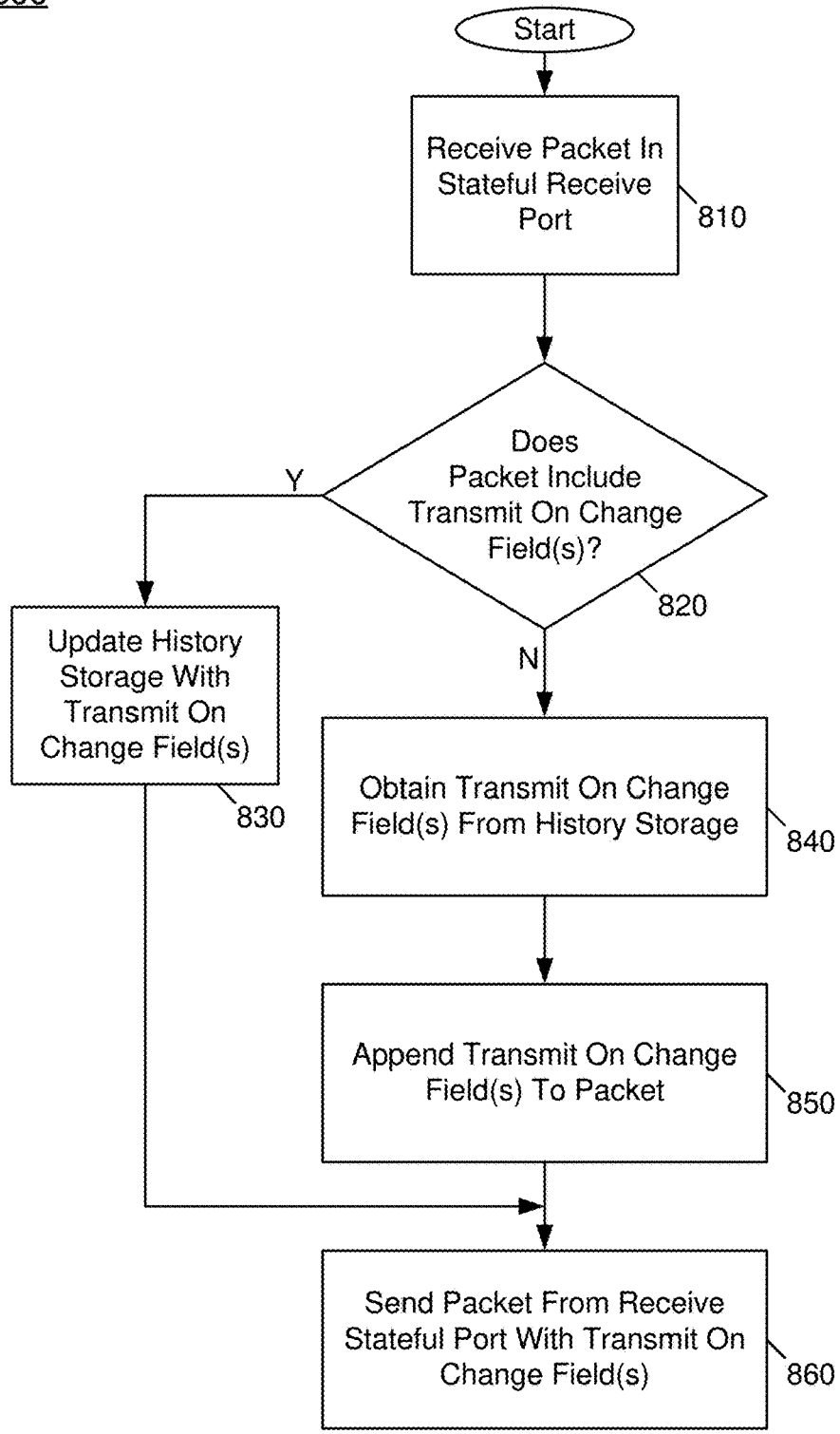
FIG. 8 is a flow diagram of a method in accordance with another embodiment of the present invention.

Referring now to FIG. 8, shown is a flow diagram of a method in accordance with another embodiment of the present invention. More specifically, method 800 is a method for handling a received data packet in a stateful receive port, e.g., as received in an IC from a link. As such, method 800 may be performed by hardware circuitry, firmware, software and/or combinations thereof. As illustrated, method 800 begins by receiving a data packet in the stateful receive port (block 810), e.g., from a source circuit as received via a link.

Next, at diamond 820 it is determined whether the received data packet includes transmit on change fields. In an embodiment, this determination may be based on an extraction indicator of the packet on other indicator (such as a context switch slot, opcode or so forth) to identify a full width data packet. If this determination is in the positive, control passes to block 830 where the history storage of the stateful port may be updated with the received transmit on change fields. That is, as a full data packet was received with at least some change in the transmit on change fields, the history storage may be updated accordingly.

Still with reference to FIG. 8, instead if it is determined that the packet does not include transmit on change fields, control passes to block 840 where these transmit on change fields may be obtained from the history storage of the stateful port. Then at block 850 these transmit on change fields are appended to the data packet. Finally at block 860, the stateful port transmits the data packet to a destination, e.g., a consuming circuit such as a core or other processing circuit. Understand of course that additional protocol processing in a transaction layer may be performed prior to providing contents of the data packet to a consuming circuit.

Although shown at this high level in the embodiment of FIG. 8, many variations and alternatives are possible. For example, when a stateful receive port includes multiple history registers, and an incoming packet is a context switch slot, its domain ID field can be used to save the corresponding context information in a given one of these multiple history registers. Otherwise, for a typical data packet, the received domain ID field may be used to obtain context information from a given history register so that it may be appended to the incoming data packet before its communicated to the consuming circuit.

Figure 9:
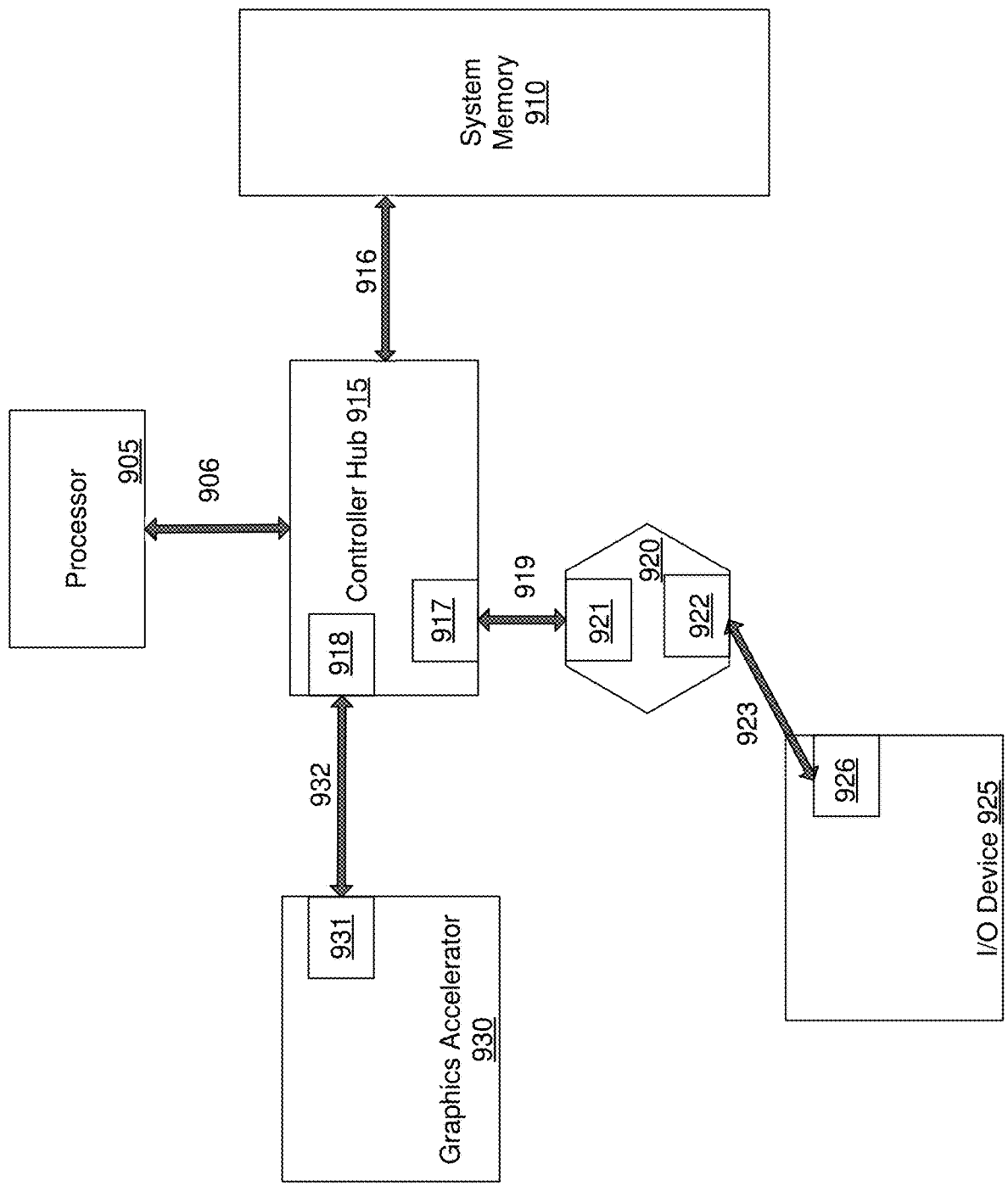
FIG. 9 is an embodiment of a fabric composed of point-to-point links that interconnect a set of components.

Embodiments may be implemented in a wide variety of interconnect structures. Referring to FIG. 9, an embodiment of a fabric composed of point-to-point links that interconnect a set of components is illustrated. System 900 includes processor 905 and system memory 910 coupled to controller hub 915. Processor 905 includes any processing element, such as a microprocessor, a host processor, an embedded processor, a co-processor, or other processor. Processor 905 is coupled to controller hub 915 through front-side bus (FSB) 906. In one embodiment, FSB 906 is a serial point-to-point interconnect. In an embodiment, processor 905 (or other components of system 900) may be implemented with one or more integrated circuits that include stateful parts to receive and transmit packets with reduced header information, as described herein.

System memory 910 includes any memory device, such as random access memory (RAM), non-volatile (NV) memory, or other memory accessible by devices in system 900. System memory 910 is coupled to controller hub 915 through memory interface 916. Examples of a memory interface include a double-data rate (DDR) memory interface, a dual-channel DDR memory interface, and a dynamic RAM (DRAM) memory interface.

In one embodiment, controller hub 915 is a root hub, root complex, or root controller in a PCIe interconnection hierarchy. Examples of controller hub 915 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 905, while controller 915 is to communicate with I/O devices, in a similar manner as described below. In some embodiments, peer-to-peer routing is optionally supported through root complex 915.

Here, controller hub 915 is coupled to switch/bridge 920 through serial link 919. Input/output modules 917 and 921, which may also be referred to as interfaces/ports 917 and 921, include/implement a layered protocol stack to provide communication between controller hub 915 and switch 920. In one embodiment, multiple devices are capable of being coupled to switch 920.

Switch/bridge 920 routes packets/messages from device 925 upstream, i.e., up a hierarchy towards a root complex, to controller hub 915 and downstream, i.e., down a hierarchy away from a root controller, from processor 905 or system memory 910 to device 925. Switch 920, in one embodiment, is referred to as a logical assembly of multiple virtual PCI-to-PCI bridge devices. Device 925 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C or CXL bus, as examples.

Graphics accelerator 930 is also coupled to controller hub 915 through serial link 932. In one embodiment, graphics accelerator 930 is coupled to an MCH, which is coupled to an ICH. Switch 920, and accordingly I/O device 925, is then coupled to the ICH. I/O modules 931 and 918 are also to implement a layered protocol stack to communicate between graphics accelerator 930 and controller hub 915. A graphics controller or the graphics accelerator 930 itself may be integrated in processor 905.

Figure 10:
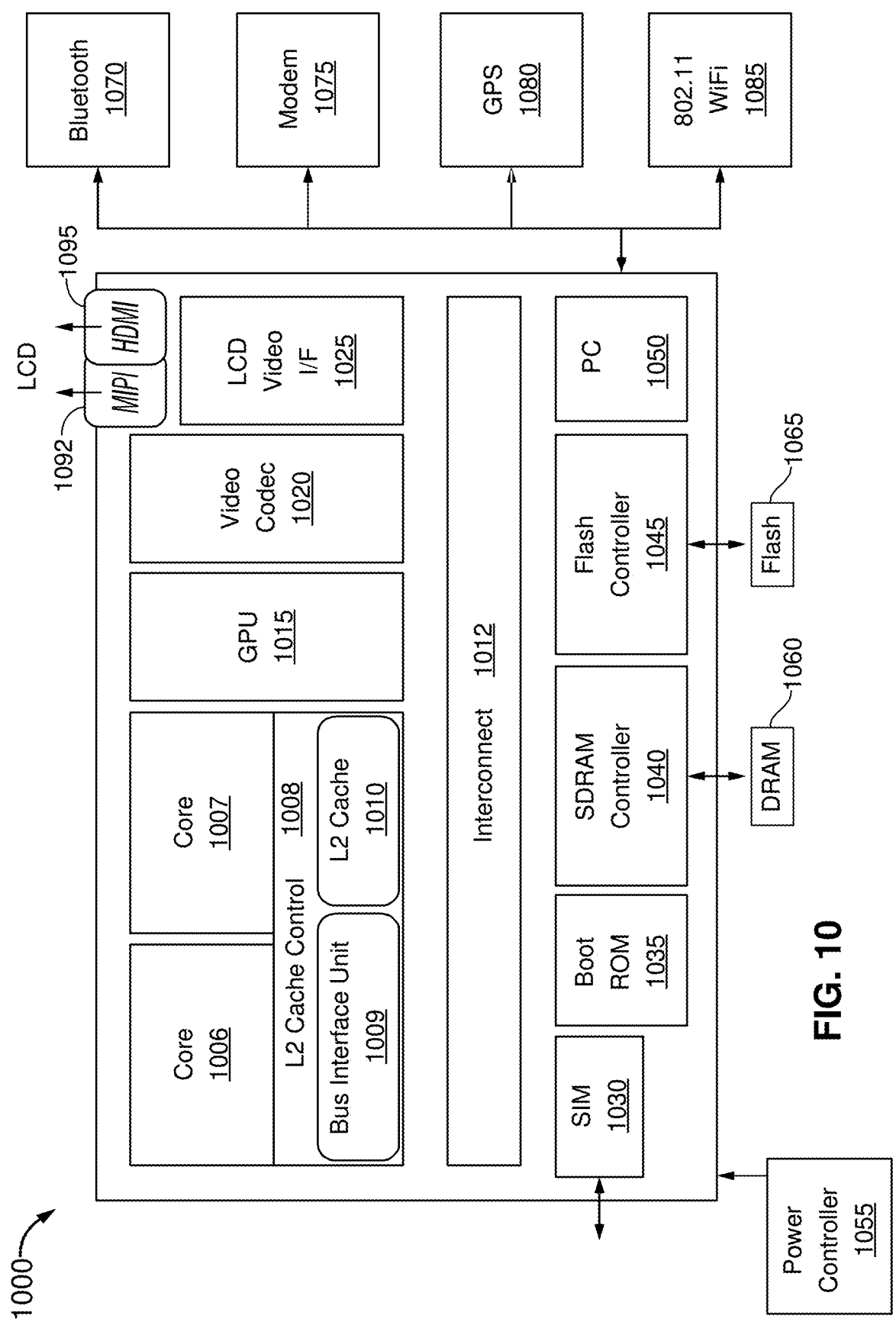
FIG. 10 is an embodiment of a system-on-chip design in accordance with an embodiment.

Turning next to FIG. 10, an embodiment of a SoC design in accordance with an embodiment is depicted. As a specific illustrative example, SoC 1000 may be configured for insertion in any type of computing device, ranging from portable device to server system. Here, SoC 1000 includes 2 cores 1006 and 1007. Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache controller 1008 that is associated with bus interface unit 1009 and L2 cache 1010 to communicate with other parts of system 1000 via an interconnect 1012.

Interconnect 1012 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g., DRAM 1060), a flash controller 1045 to interface with non-volatile memory (e.g., flash 1065), a peripheral controller 1050 (e.g., an eSPI interface) to interface with peripherals, video codec 1020 and video interface 1025 to display and receive input (e.g., touch enabled input), GPU 1015 to perform graphics related computations, etc. In an embodiment, interconnect 1012 may be configured to communicate packets that have reduced header information, as described herein. In addition, the system illustrates peripherals for communication, such as a Bluetooth module 1070, 3G modem 1075, GPS 1080, and WiFi 1085. Also included in the system is a power controller 1055. Further illustrated in FIG. 10, system 1000 may additional include interfaces including a MIPI interface 1092, e.g., to a display and/or an HDMI interface 1095 also which may couple to the same or a different display.

Figure 11:
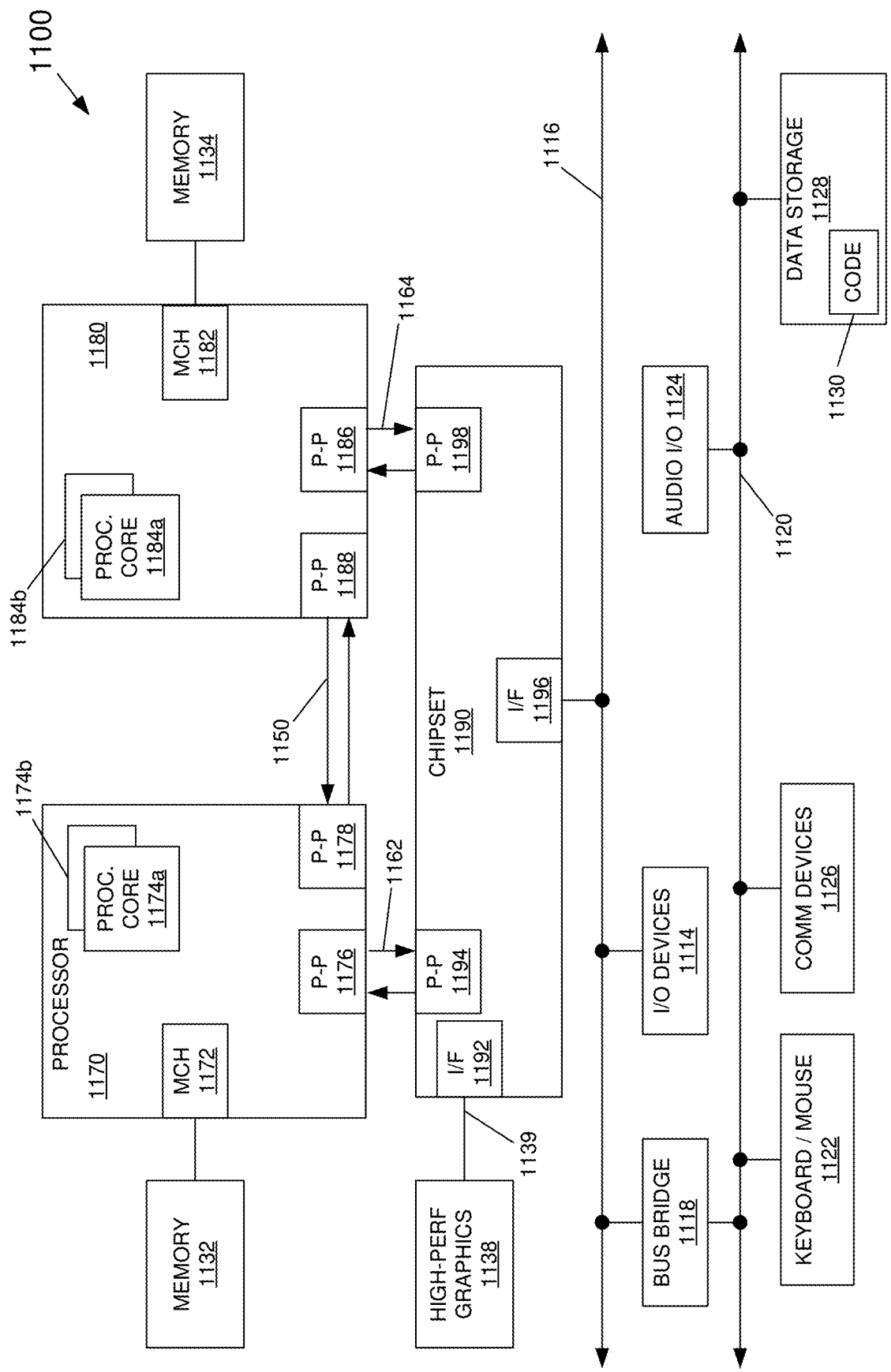
FIG. 11 is a block diagram of a system in accordance with an embodiment of the present invention.

Referring now to FIG. 11, shown is a block diagram of a system in accordance with an embodiment of the present invention. As shown in FIG. 11, multiprocessor system 1100 includes a first processor 1170 and a second processor 1180 coupled via a point-to-point interconnect 1150. As shown in FIG. 11, each of processors 1170 and 1180 may be many core processors including representative first and second processor cores (i.e., processor cores 1174a and 1174b and processor cores 1184a and 1184b). In an embodiment, processors 1170 and 1180 and other components may couple via interconnects that can realize improved link efficiency using reduced header information communications, as described herein.

Still referring to FIG. 11, first processor 1170 further includes a memory controller hub (MCH) 1172 and point-to-point (P-P) interfaces 1176 and 1178. Similarly, second processor 1180 includes a MCH 1182 and P-P interfaces 1186 and 1188. As shown in FIG. 11, MCH's 1172 and 1182 couple the processors to respective memories, namely a memory 1132 and a memory 1134, which may be portions of system memory (e.g., DRAM) locally attached to the respective processors. First processor 1170 and second processor 1180 may be coupled to a chipset 1190 via P-P interconnects 1162 and 1164, respectively. As shown in FIG. 11, chipset 1190 includes P-P interfaces 1194 and 1198.

Furthermore, chipset 1190 includes an interface 1192 to couple chipset 1190 with a high performance graphics engine 1138, by a P-P interconnect 1139. As shown in FIG. 11, various input/output (I/O) devices 1114 may be coupled to first bus 1116, along with a bus bridge 1118 which couples first bus 1116 to a second bus 1120. Various devices may be coupled to second bus 1120 including, for example, a keyboard/mouse 1122, communication devices 1126 and a data storage unit 1128 such as a disk drive or other mass storage device which may include code 1130, in one embodiment. Further, an audio I/O 1124 may be coupled to second bus 1120.

The following examples pertain to further embodiments.

In one example, an apparatus comprises: at least one circuit to generate a data packet; and an input/output port coupled to the at least one circuit to receive the data packet and send the data packet to a device coupled to the apparatus via a link. The input/output port comprises a stateful transmit port that comprises: a history storage to store a value corresponding to a transmit on change field of a prior data packet; a comparator to compare a transmit on change field of the data packet to the value stored in the history storage; and a selection circuit to output the data packet without the transmit on change field when the transmit on change field of the data packet matches the value.

In an example, the stateful transmit port further comprises an extraction circuit to remove the transmit on change field from a header of the data packet and send the transmit on change field to the comparator.

In an example, the selection circuit is to output the data packet with the transmit on change field of the data packet when the transmit on change field of the data packet does not match the value.

In an example, the transmit on change field comprises context information associated with the data packet.

In an example, the context information comprises at least one of bus device function information or a process address space identifier.

In an example, when the transmit on change field of the data packet does not match the value, the history storage is to store the transmit on change field of the data packet.

In an example, the input/output port further comprises a stateful receive port to append a stored transmit change field to a second data packet received via the link, where the received second data packet does not include a transmit on change field.

In an example, the stateful receive port comprises: a second history storage to store a transmit on change field of a prior received data packet as the stored transmit on change field; and a second selection circuit to output the second data packet with the stored transmit on change field to the at least one circuit.

In an example, the apparatus further comprises a plurality of stateful transmit ports, each of the plurality of stateful transmit ports associated with one of a plurality of devices coupled to the apparatus via the link.

In an example, the stateful transmit port comprises a plurality of history storages, each of the plurality of history storages to store transmit on change information of an associated context.

In an example, the stateful transmit port is to store transmit on change information of the data packet in a first history storage when the data packet is a context switch slot.

In another example, a method comprises: receiving, in a first stateful port of an integrated circuit, a data packet; comparing a transmit on change portion of the data packet to a value stored in a history storage; and in response to the transmit on change portion matching the value, sending the data packet without the transmit on change portion to another device coupled to the integrated circuit.

In an example, the method further comprises in response to the transmit on change portion not matching the value, sending the data packet with the transmit on change portion to the another device.

In an example, the method further comprises in response to the transmit on change portion not matching the value, replacing the value stored in the history storage with the transmit on change portion.

In an example, the method further comprises: receiving, from the another device, a second data packet in a second stateful port of the integrated circuit, the second data packet not including a transmit on change portion; and appending a stored transmit on change portion to the second data packet and sending the second data packet with the appended stored transmit on change portion to a consuming circuit of the integrated circuit.

In an example, the method further comprises: receiving, in the first stateful port, a second data packet; and in response to determining that the second data packet is a context switch slot, sending the second data packet with a transmit on change portion to the another device.

In an example, the method further comprises updating context information of a first history storage of the first stateful port when the data packet is the context switch slot.

In yet another example, a system has a processor including at least one core to generate data and an input/output circuit to receive the data and generate a data packet having a header and at least a portion of the data. The input/output circuit is associated with a stateful transmit port that comprises: a history storage having a plurality of entries each to store context information of a prior data packet; and a control circuit, in response to the data packet having a header portion of the header that matches the context information stored in one of the plurality of entries, to output the data packet without the header portion. The system may further include an interconnect coupled to the processor and a device coupled to the interconnect, where the device includes a stateful receive port to receive the data packet without the header portion, obtain second context information from a second history storage and append the second context information to the data packet without the header portion, where the second context information matches the context information.

In an example, the stateful receive port is to obtain the second context information based at least in part on a domain identifier included in the data packet without the header portion.

In an example, the control circuit, in response to the data packet having a header portion of the header with new context information, to output the data packet having the header portion with the new context information and store the new context information in one of the plurality of entries.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   at least one circuit to generate a data packet; and
   an input/output port coupled to the at least one circuit to receive the data packet and send the data packet to a device coupled to the apparatus via a link, the input/output port comprising a stateful transmit port comprising:
   a history storage to store a value corresponding to a transmit on change field of a prior data packet;
   a comparator to compare a transmit on change field of the data packet to the value stored in the history storage; and
   a selection circuit to output the data packet without the transmit on change field when the transmit on change field of the data packet matches the value.

2. The apparatus of claim 1, wherein the stateful transmit port further comprises an extraction circuit to remove the transmit on change field from a header of the data packet and send the transmit on change field to the comparator.

3. The apparatus of claim 1, wherein the selection circuit is to output the data packet with the transmit on change field of the data packet when the transmit on change field of the data packet does not match the value.

4. The apparatus of claim 1, where the transmit on change field comprises context information associated with the data packet.

5. The apparatus of claim 4, wherein the context information comprises at least one of bus device function information or a process address space identifier.

6. The apparatus of claim 1, wherein when the transmit on change field of the data packet does not match the value, the history storage is to store the transmit on change field of the data packet.

7. The apparatus of claim 1, wherein the input/output port further comprises a stateful receive port to append a stored transmit on change field to a second data packet received via the link, wherein the received second data packet does not include a transmit on change field.

8. The apparatus of claim 7, wherein the stateful receive port comprises:
   a second history storage to store a transmit on change field of a prior received data packet as the stored transmit on change field; and
   a second selection circuit to output the second data packet with the stored transmit on change field to the at least one circuit.

9. The apparatus of claim 1, further comprising a plurality of stateful transmit ports, each of the plurality of stateful transmit ports associated with one of a plurality of devices coupled to the apparatus via the link.

10. The apparatus of claim 1, wherein the stateful transmit port comprises a plurality of history storages, each of the plurality of history storages to store transmit on change information of an associated context.

11. The apparatus of claim 10, wherein the stateful transmit port is to store transmit on change information of the data packet in a first history storage when the data packet is a context switch slot.

12. At least one non-transitory computer readable storage medium having stored thereon instructions, which if performed by a machine cause the machine to perform a method comprising:
   receiving, in a first stateful port of an integrated circuit, a data packet;
   comparing a transmit on change portion of the data packet to a value stored in a history storage; and
   in response to the transmit on change portion matching the value, sending the data packet without the transmit on change portion to another device coupled to the integrated circuit.

13. The at least one non-transitory computer readable storage medium of claim 12, wherein the method further comprises in response to the transmit on change portion not matching the value, sending the data packet with the transmit on change portion to the another device.

14. The at least one non-transitory computer readable storage medium of claim 13, wherein the method further comprises in response to the transmit on change portion not matching the value, replacing the value stored in the history storage with the transmit on change portion.

15. The at least one non-transitory computer readable storage medium of claim 12, wherein the method further comprises:
   receiving, from the another device, a second data packet in a second stateful port of the integrated circuit, the second data packet not including a transmit on change portion; and
   appending a stored transmit on change portion to the second data packet and sending the second data packet with the appended stored transmit on change portion to a consuming circuit of the integrated circuit.

16. The at least one non-transitory computer readable storage medium of claim 12, wherein the method further comprises:
receiving, in the first stateful port, a second data packet; and
in response to determining that the second data packet is a context switch slot, sending the second data packet with a transmit on change portion to the another device.

17. The at least one non-transitory computer readable storage medium of claim 16, wherein the method further comprises updating context information of a first history storage of the first stateful port when the data packet is the context switch slot.

18. A system comprising:
a processor including at least one core to generate data and an input/output circuit to receive the data and generate a data packet having a header and at least a portion of the data, wherein the input/output circuit is associated with a stateful transmit port comprising:
a history storage having a plurality of entries each to store context information of a prior data packet; and
a control circuit, in response to the data packet having a header portion of the header that matches the context information stored in one of the plurality of entries, to output the data packet without the header portion;
an interconnect coupled to the processor; and
a device coupled to the interconnect, wherein the device includes a stateful receive port to receive the data packet without the header portion, obtain second context information from a second history storage and append the second context information to the data packet without the header portion, wherein the second context information matches the context information.

19. The system of claim 18, wherein the stateful receive port is to obtain the second context information based at least in part on a domain identifier included in the data packet without the header portion.

20. The system of claim 18, wherein the control circuit, in response to the data packet having a header portion of the header with new context information, to output the data packet having the header portion with the new context information and store the new context information in one of the plurality of entries.

\* \* \* \* \*